(12) United States Patent
Awada et al.

(10) Patent No.: US 11,649,619 B2
(45) Date of Patent: May 16, 2023

(54) FAUCET DEVICE

(71) Applicant: LIXIL Corporation, Tokyo (JP)

(72) Inventors: Hiromi Awada, Tokyo (JP); Ryosuke Yoshitani, Tokyo (JP)

(73) Assignee: LIXIL Corporation, Tokyo (JP)

(*) Notice: Subject to any disclaimer, the term of this patent is extended or adjusted under 35 U.S.C. 154(b) by 673 days.

(21) Appl. No.: 16/689,983

(22) Filed: Nov. 20, 2019

(65) Prior Publication Data

US 2020/0157789 A1 May 21, 2020

(30) Foreign Application Priority Data

Nov. 21, 2018 (JP) ............................. JP2018-218221
Nov. 21, 2018 (JP) ............................. JP2018-218222

(51) Int. Cl.
*E03C 1/04* (2006.01)
*C02F 1/00* (2023.01)
*E03C 1/046* (2006.01)

(52) U.S. Cl.
CPC ............ *E03C 1/0412* (2013.01); *C02F 1/003* (2013.01); *E03C 1/0403* (2013.01); *E03C 1/0404* (2013.01); *C02F 2201/006* (2013.01); *C02F 2307/06* (2013.01); *E03C 1/046* (2013.01); *Y10T 137/9464* (2015.04)

(58) Field of Classification Search
CPC .... E03C 1/0412; E03C 1/0403; E03C 1/0404; E03C 1/046; E02F 1/003; E02F 2201/006; E02F 2307/06; Y10T 137/9464
See application file for complete search history.

(56) References Cited

U.S. PATENT DOCUMENTS

| 5,192,436 | A | * | 3/1993 | Sasaki | C02F 1/003 |
| | | | | | 137/562 |
| 5,705,067 | A | | 1/1998 | Sumi et al. | |
| 9,481,985 | B1 | * | 11/2016 | Chen | E03C 1/0412 |
| 11,414,846 | B2 | * | 8/2022 | Dahan | F16K 35/027 |
| 2006/0086394 | A1 | * | 4/2006 | Molina | F16K 11/207 |
| | | | | | 137/606 |
| 2017/0002552 | A1 | * | 1/2017 | Wang | E03C 1/0412 |
| 2017/0101325 | A1 | * | 4/2017 | Ye | B01D 35/046 |
| 2018/0119394 | A1 | * | 5/2018 | Zhan | E03C 1/02 |
| 2018/0179743 | A1 | * | 6/2018 | Tang | G08B 5/36 |
| 2019/0234055 | A1 | * | 8/2019 | Gao | E03C 1/0404 |

FOREIGN PATENT DOCUMENTS

| JP | H4-210287 A | 7/1992 |
| JP | H5-203071 A | 8/1993 |
| JP | 9-41444 | 2/1997 |
| JP | 2001-303634 A | 10/2001 |
| JP | 2003-148638 A | 5/2003 |

* cited by examiner

*Primary Examiner* — Craig M Schneider
*Assistant Examiner* — Frederick D Soski
(74) *Attorney, Agent, or Firm* — Morrison & Foerster LLP

(57) ABSTRACT

A faucet device includes a hot water/water mixing valve, a water purification cartridge, a primary side flow path that supplies water to the hot water/water mixing valve and the water purification cartridge, and a secondary side flow path that discharges mixed water flowing out from the hot water/water mixing valve and purified water flowing out from the water purification cartridge to a water discharge port. The primary side flow path and the secondary side flow path are disposed between the hot water/water mixing valve and the water purification cartridge.

9 Claims, 12 Drawing Sheets

FAUCET DEVICE

REFERENCE TO RELATED APPLICATIONS

This application claims the priority of Japanese Patent Application No. 2018-218221 filed Nov. 21, 2018 and Japanese Patent Application No. 2018-218222 filed Nov. 21, 2018, the entire contents of each of which are incorporated herein by reference.

BACKGROUND OF THE INVENTION

The present disclosure relates to a faucet device.

Japanese Unexamined Patent Application Publication No. 9-41444 discloses a faucet device including a hot water/water mixing valve and a water purification cartridge. The hot water/water mixing valve is disposed on the upper side of the faucet device, and the water purification cartridge is disposed on the lower side of the faucet device apart from the hot water/water mixing valve.

SUMMARY OF THE INVENTION

In the faucet device of Japanese Unexamined Patent Application Publication No. 9-41444, since the hot water/water mixing valve and the water purification cartridge are disposed apart from each other, a primary side flow path, that supplies water to the hot water/water mixing valve and the water purification cartridge, and a secondary side flow path, that discharges the water flowing out from the hot water/water mixing valve and the water purification cartridge to the water discharge port, may become longer, with the result that the faucet device may become larger.

A faucet device according to the present disclosure includes a hot water/water mixing valve, a water purification cartridge, a primary side flow path that supplies water to the hot water/water mixing valve and the water purification cartridge, and a secondary side flow path that discharges mixed water flowing out from the hot water/water mixing valve and purified water flowing out from the water purification cartridge, to a water discharge port. At least one of the primary side flow path and the secondary side flow path is disposed between the hot water/water mixing valve and the water purification cartridge.

In some embodiments, since at least one of the primary side flow path and the secondary side flow path is disposed between the hot water/water mixing valve and the water purification cartridge, the primary side flow path and the secondary side flow path can be shortened. Therefore, the faucet device can be made smaller.

DETAILED DESCRIPTION OF THE INVENTION

Figure 1:
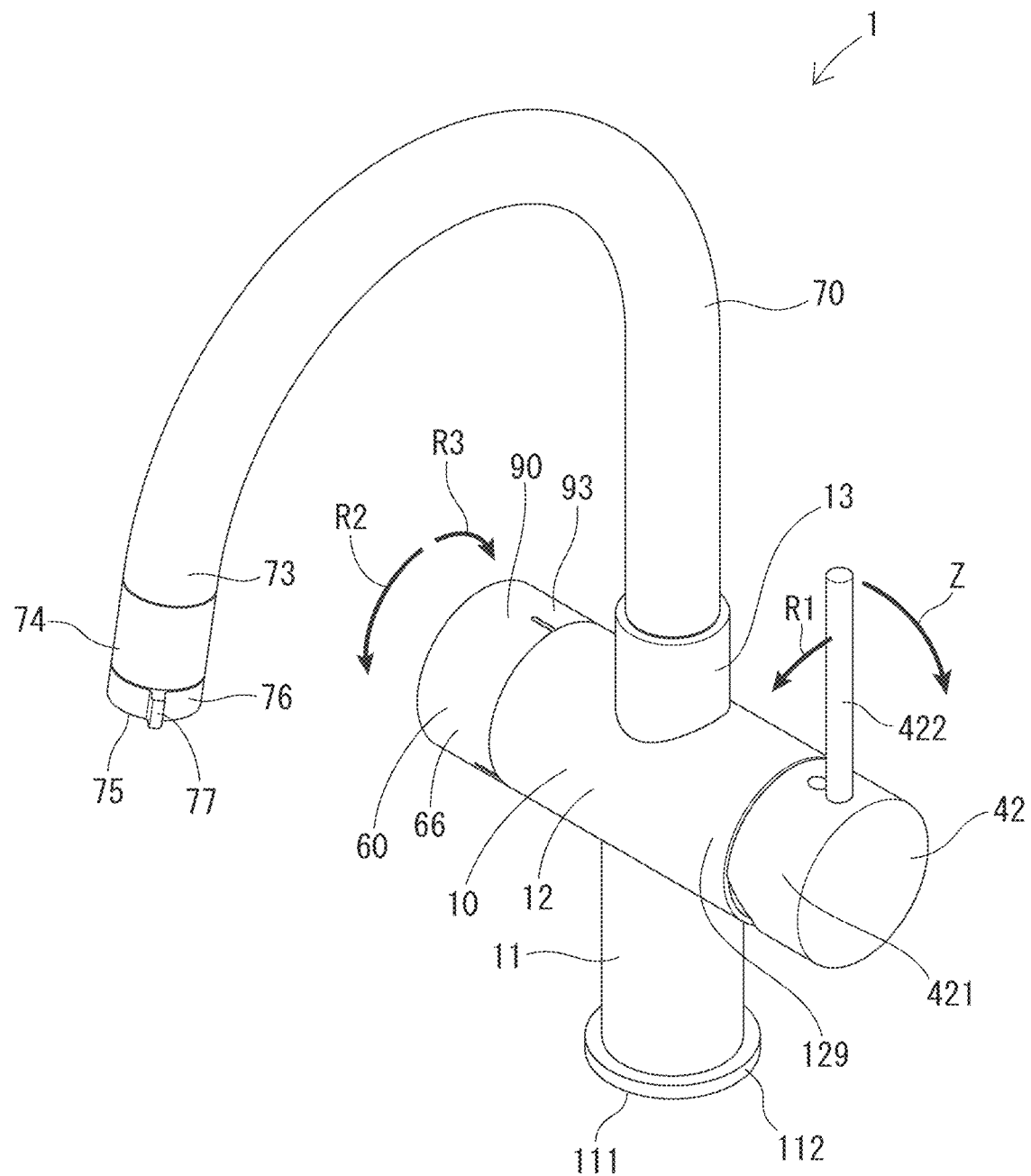
FIG. 1 is a perspective view showing a state in which a water discharge device according to a some embodiments of the present disclosure is attached to a counter.

In some embodiments, the hot water/water mixing valve and the water purification cartridge may be disposed side by side in a horizontal direction when attached to a to-be-attached portion.

In some embodiments, when the hot water/water mixing valve and the water purification cartridge are disposed close to each other, the primary side flow path and the secondary side flow path can be shortened. Thus, the faucet device can be made smaller.

A faucet device of the present disclosure may include a first accommodating portion that accommodates the hot water/water mixing valve and a second accommodating portion that accommodates the water purification cartridge. The first accommodating portion and the second accommodating portion may be formed by opening both end surfaces of a circular column extending in a horizontal direction.

In some embodiments, the structure of the first accommodating portion and the second accommodating portion can be simplified. Thus, the faucet device can be made smaller.

A faucet device of the present disclosure may include a base portion attached to the to-be-attached p ortion, and a discharging portion extending from the base portion and having the water discharge port provided on a distal end side. The base portion may interiorly include the primary side flow path, the secondary side flow path, a hot water side flow path that supplies hot water to the hot water/water mixing valve, and a water supply hose connecting the secondary side flow path and the water discharge port. The discharging portion may interiorly include the water supply hose such that the water supply hose is slidably movable, and hold the water discharge port such that the water discharge port can be freely pulled out together with the water supply hose.

In some embodiments, the secondary side flow path through which the mixed water flowing out from the hot water/water mixing valve flows and the secondary side flow path through which the purified water flowing out from the water purification cartridge flows are joined into the water supply hose and connected to the water discharge port. Thus, the flow paths can be collected, so that the faucet device can be made smaller. Furthermore, since the water discharge port can be freely pulled out, usability of the faucet device can be improved.

In some embodiments, a branched portion may be arranged between the hot water/water mixing valve and the water purification cartridge. The primary side flow path is branched at the branched portion to be connected to a water supply path toward the hot water/water mixing valve and to a raw water supply path toward the water purification cartridge.

In some embodiments, the water supply path to the hot water/water mixing valve and the raw water supply path to the water purification cartridge can be collected in one path up to the branched portion. Thus, the faucet device can be made smaller.

In some embodiments, a joined portion may be arranged between the hot water/water mixing valve and the water purification cartridge. A mixed water outflow path from the hot water/water mixing valve and a purified water outflow path from the water purification cartridge are joined at the joined portion to be connected to the secondary side flow path.

In some embodiments, the mixed water outflow path from the hot water/water mixing valve and the purified water outflow path from the water purification cartridge can be collected into one path from the joined portion. Thus, the faucet device can be made smaller.

A faucet device of the present disclosure may further include a faucet main body. The faucet main body includes a water passing portion through which water flows, an accommodating portion communicating with the water passing portion, and an open/close valve that opens and closes a flow path between the water passing portion and the accommodating portion. The water purification cartridge may further include an accommodated portion that is accommodated in the accommodating portion so as to be detachable therefrom, and an operating portion that is exposed from the accommodating portion and operated to open and close the open/close valve. The water purification cartridge may incorporate a reforming portion that reforms raw water flowing into the accommodating portion into purified water.

In some embodiments, since the water purification cartridge includes the operating portion that is operated to open and close the open/close valve, the operating portion does not need to be arranged in the faucet main body. Thus, the faucet device can be made smaller.

In some embodiments, the accommodated portion may have a circular column outer shape and may be accommodated in the accommodating portion so as to be rotatable about a central axis of the accommodated portion.

In some embodiments, since the accommodated portion having a circular column shape rotates about its central axis, the accommodating portion can be made smaller by being formed in a circular column shape having the same central axis as the accommodated portion.

In some embodiments, the water purification cartridge may include an inflow port which is provided on an outer peripheral side and to which the raw water flows in from the water passing portion, and an outflow port which is provided on a central axis side and from which the purified water flows out from the reforming portion.

In some embodiments, since the outflow port is provided on the central axis side of the water purification cartridge, the structure of the water passing portion can be simplified. Thus, the faucet main body can be made smaller.

In some embodiments, the reforming portion may be disposed across an inside of the accommodated portion and an inside of the operating portion.

In some embodiments, since the reforming portion is arranged not only inside the accommodated portion but also inside the operating portion exposed from the accommodating portion of the faucet main body, the volume of the reforming portion can be increased so that the performance of the water purification cartridge can be improved; for example, life of the water purification cartridge is extended. Furthermore, by arranging the reforming portion also inside the operating portion, the accommodated portion can be made smaller, and thus, the faucet main body can be made smaller.

Figure 2:
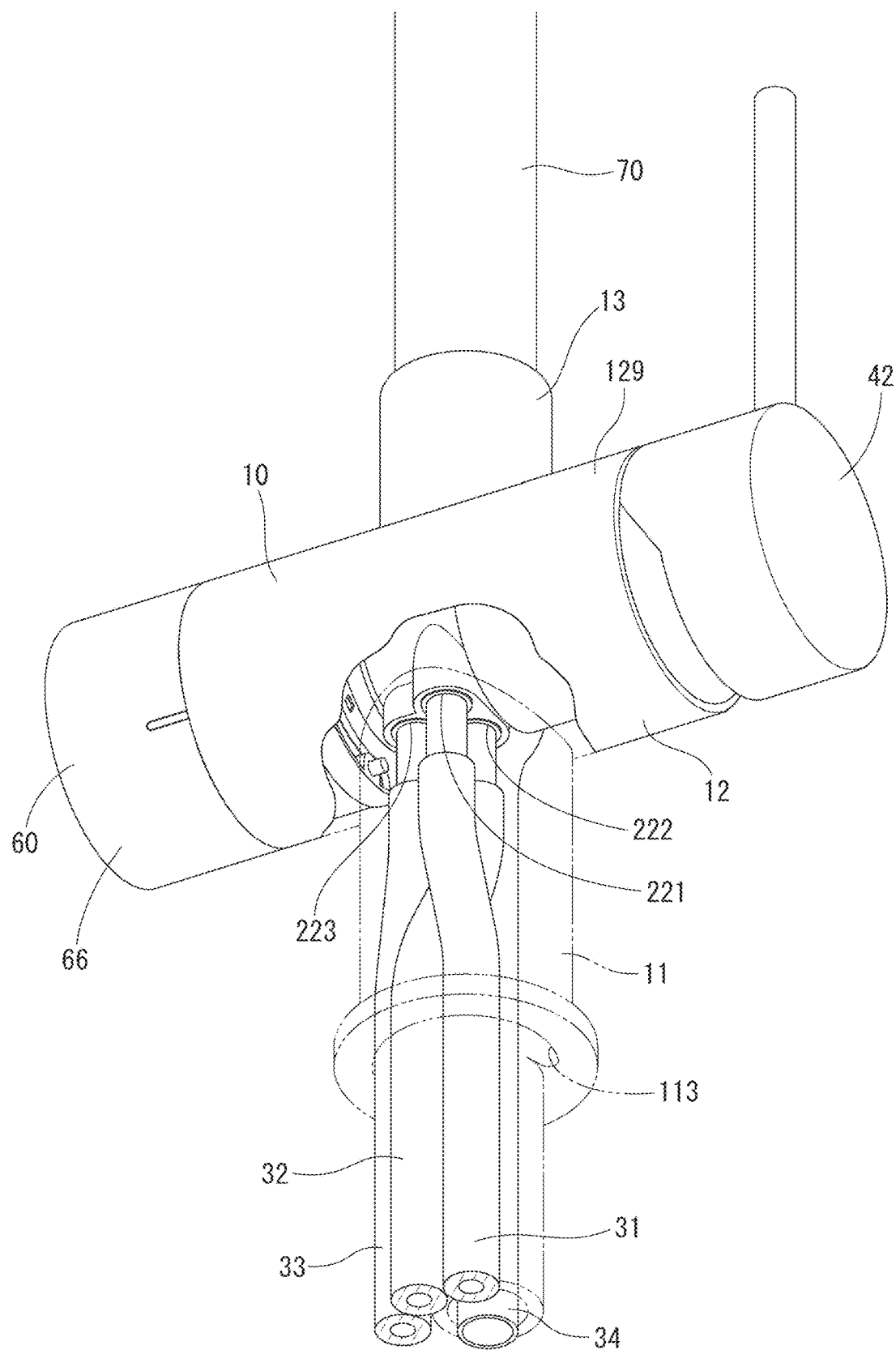
FIG. 2 is a perspective view showing a connecting portion between a main body portion and a water supply pipe with a base portion shown transparently.
Figure 3:
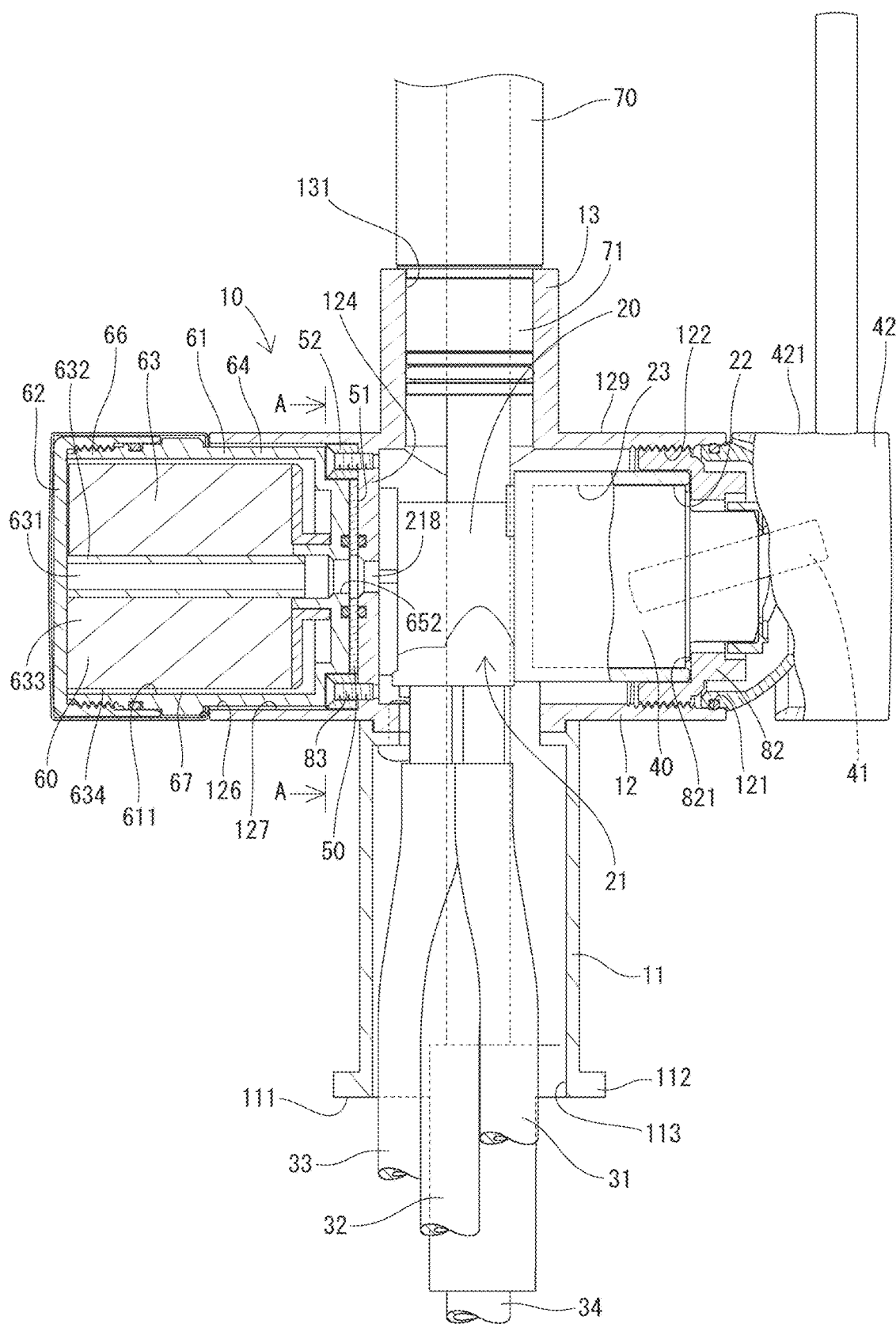
FIG. 3 is a partial cross-sectional view showing an internal structure of a faucet main body.
Figure 4:
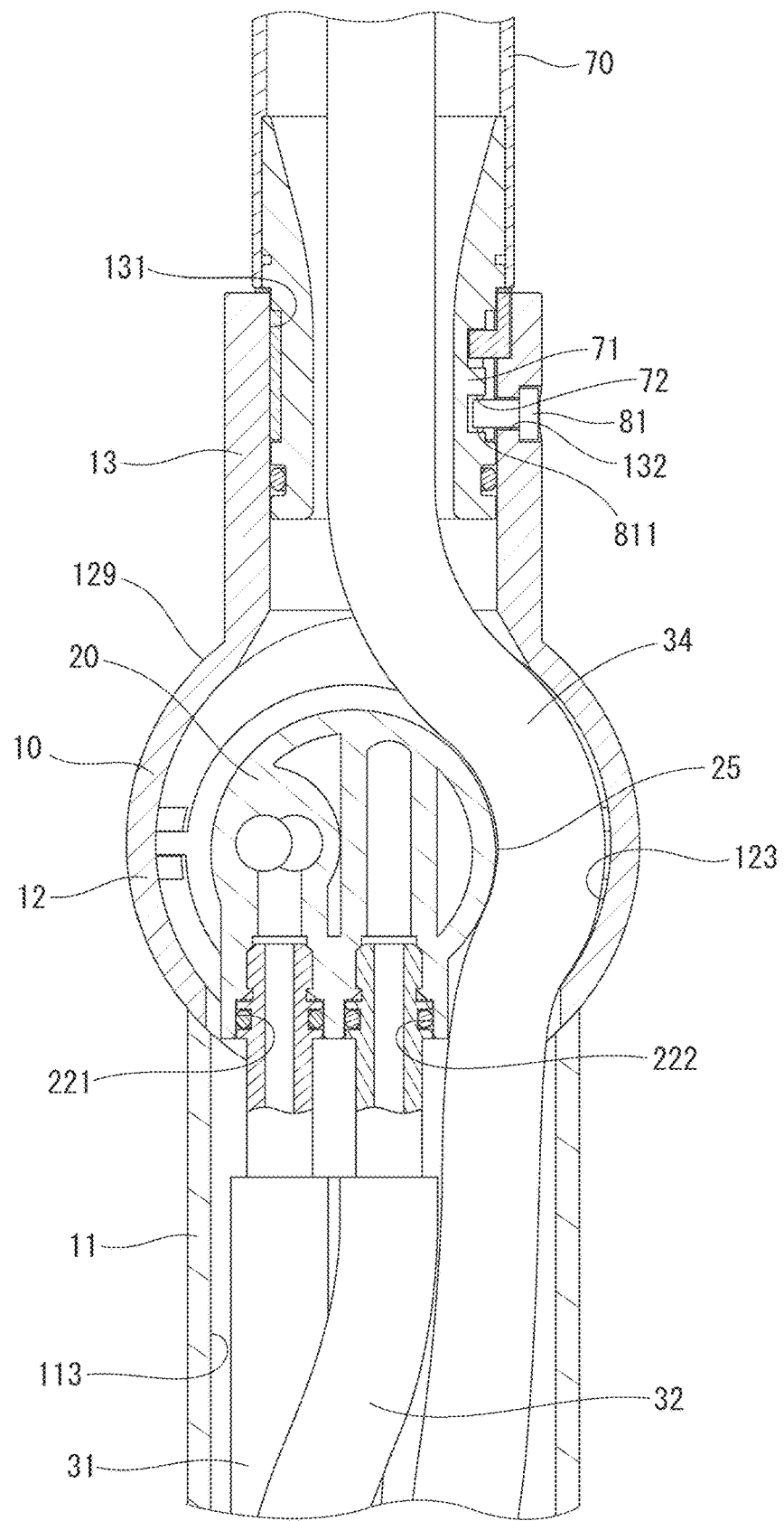
FIG. 4 is a partial cross-sectional view showing a portion where a water supply hose is inserted through the faucet main body.
Figure 6:
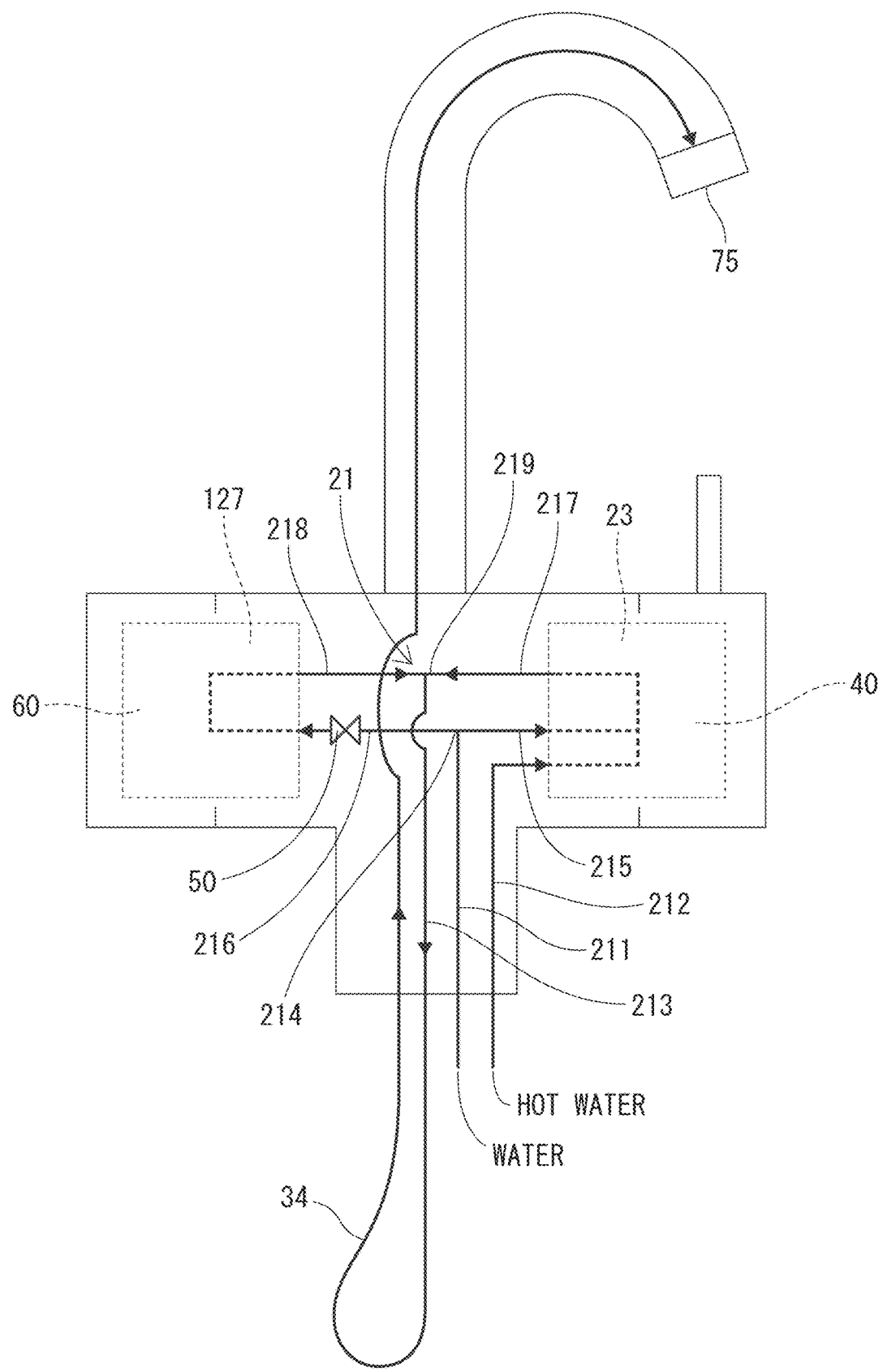
FIG. 6 is a schematic view showing a water passing portion of the faucet device.
Figure 7:
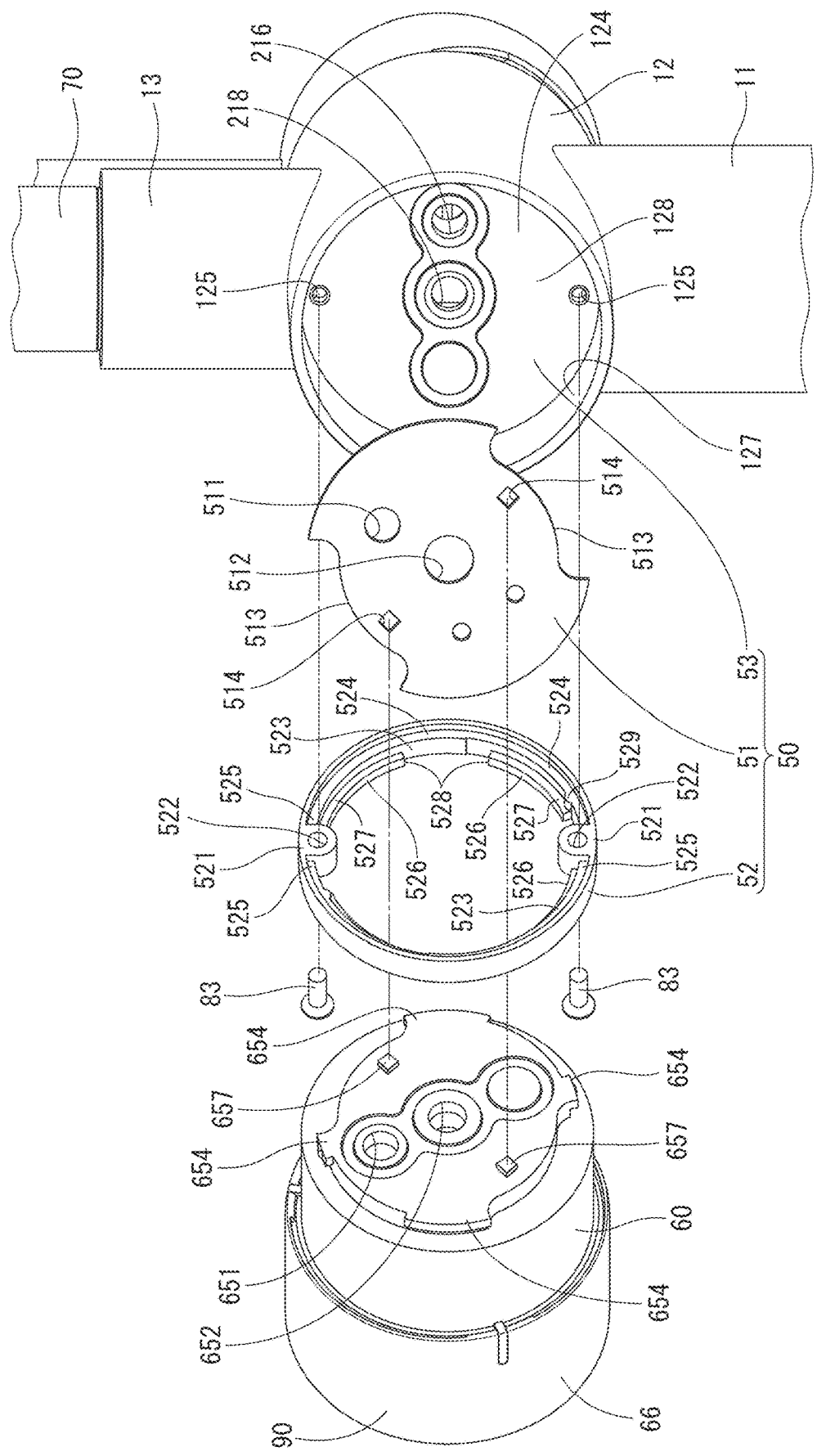
FIG. 7 is an exploded view of components accommodated in a second accommodating portion.

In the following description, as for an up and down direction, the direction shown in FIGS. 1 to 4, 6, 7, and 9 is defined as the up and down direction as shown. As for a left and right direction, the direction shown in FIGS. 3, 6, and 7 is defined as a left and right direction as shown. As for a front and back direction, the left side shown in FIG. 4 is defined as a front side, and the right side shown in FIG. 4 is defined as a back side. As for a depth direction with respect to the user, the left side shown in FIG. 1 is defined as a forward side, and the right side shown in FIG. 1 is defined as a backward side.

Furthermore, the water flowing to the hot water/water mixing valve is referred to simply as water and the water flowing to the water purification cartridge is referred to as raw water, but both of the water and raw water are water having the same component supplied from the same water supply source. Furthermore, it is possible for the hot water/water mixing valve to flow out only water or only hot water by adjusting the mixing ratio of water and hot water, but whatever flows out from the hot water/water mixing valve is referred to simply as mixed water.

As shown in FIG. 1, a faucet device 1 according to some embodiments is attached to an upper surface of a counter of a sink which is a to-be-attached portion. The upper surface of the counter is horizontal. The faucet device 1 includes a faucet main body 10, a water purification cartridge 60, and a discharge pipe 70. The faucet device 1 discharges mixed water obtained by mixing water and hot water, and purified water obtained by removing chlorine and turbidity from raw water.

The faucet main body 10 has a base portion 11 to be installed on the upper surface of the counter, a main body portion 12 incorporating a water passing member 20, and a holding portion 13 that holds the discharge pipe 70. The faucet main body 10 is formed in a cross shape as a whole.

The outer appearance of the base portion 11 comprises a circular column shape extending upward, and a lower end surface 111 of the base portion 11 is installed on the upper surface of the counter. The outer periphery of the base portion 11 on the lower side is provided with an enlarged diameter portion 112 having a larger diameter in a circumferential direction than the outer periphery of the base portion 11 on the upper side, which increases the contact area between the lower end surface 111 of the base portion 11 and the upper surface of the counter. As shown in FIGS. 2 and 3, a pipe accommodating portion 113 is formed inside the base portion 11 penetrating in the up and down direction. The pipe accommodating portion 113 accommodates a water supply pipe 31, a hot water supply pipe 32, an outflow pipe 33 and a water supply hose 34. The base portion 11 includes an attachment member (not shown), and the upper surface and the lower surface of the counter are sandwiched by the attachment member, so that the faucet device 1 is fixed to the counter.

The outer appearance of the main body portion 12 is a circular column shape extending in the horizontal direction, and the main body portion 12 is connected to the upper side of the base portion 11. As shown in FIG. 3, the main body portion 12 has both end surfaces formed with openings 121 and 126, and has a wall portion 124 formed inside that partitions two spaces. In the space on the right side of the wall portion 124, the water passing member 20 including a water passing portion 21 through which water flows is arranged. The water passing member 20 has an end surface on the right side formed with an opening 22 that communicates with the opening 121 of the main body portion 12, and has a first accommodating portion 23 formed inside that accommodates a hot water/water mixing valve 40. The first accommodating portion 23 communicates with the water passing portion 21. In the space on the left side of the wall portion 124, a second accommodating portion 127 that accommodates a part of the water purification cartridge 60 is formed. An open/close valve 50, which will be described later, is disposed between the water passing member 20 and the water purification cartridge 60. Operating portions are respectively arranged on both end sides of the main body portion 12; a mixing valve operating portion 42 for operating the hot water/water mixing valve 40 is arranged on the right side, and a water purification operating portion 66 for operating the open/close valve 50 is arranged on the left side.

The holding portion 13 has an outer appearance of a circular column shape and extends upward from the upper side of an outer peripheral surface 129 of the main body portion 12. A space 131 penetrating in the up and down direction is formed inside the holding portion 13, and a proximal end 71 of the discharge pipe 70 is inserted therein. As shown in FIG. 4, the outer periphery of the holding portion 13 is formed with a screw hole 132 penetrating in the horizontal direction. The screw hole 132 is located at a position facing a groove 72 formed on the outer periphery of the proximal end 71 of the discharge pipe 70. A screw member 81 is screwed into the screw hole 132. The screw member 81 projects toward the inner peripheral side of the holding portion 13, and an end 811 of the screw member 81 is inserted into the groove 72 of the discharge pipe 70. Accordingly, when the discharge pipe 70 is caused to move upward, the groove 72 of the discharge pipe 70 is locked to the end 811 of the screw member 81, so that the upward movement of the discharge pipe 70 is prevented.

As shown in FIG. 1, the discharge pipe 70, which is a discharging portion for discharging mixed water and purified water, has an outer appearance of a so-called gooseneck shape extending vertically upward from the proximal end 71 and curved at the middle portion so that a distal end 73 is directed diagonally downward. As shown in FIG. 4, the proximal end 71 of the discharge pipe 70 is inserted in the holding portion 13, and the discharge pipe 70 is connected so as to extend upward from the base portion 11 via the main body portion 12 and the holding portion 13. The discharge pipe 70 is held so as to be rotatable with respect to the main body portion 12 with the pipe axis as a rotation axis. The water supply hose 34 extending from the lower side of the counter is accommodated inside the discharge pipe 70 so as to be slidably movable. As shown in FIG. 1, a water discharge head 74 is detachably held at the distal end 73 of the discharge pipe 70. The water discharge head 74 is connected to the water supply hose 34 and can be freely pulled out together with the water supply hose 34 from the distal end 73 of the discharge pipe 70. The water discharge head 74 discharges the mixed water and the purified water supplied from the water supply hose 34 through the water discharge port 75 formed at the distal end surface. A distal end 76 of the water discharge head 74 is rotatable with the pipe axis as a rotation axis, and has a knob 77 protruding in the outer peripheral direction. The user can switch the mixed water and the purified water discharged from the water discharge port 75 into a shower flow or a straightened flow by pinching the knob 77 and rotating the distal end 76.

Next, the internal structure of the faucet main body 10 will be described in detail.

Figure 5A:
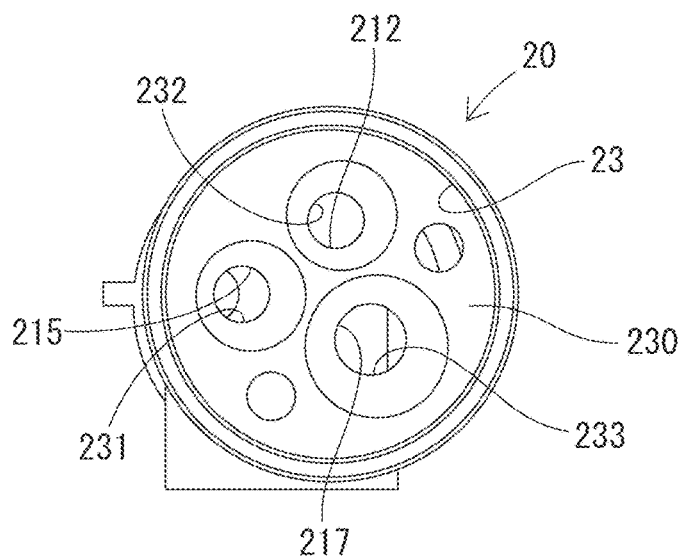
FIG. 5A is a side view of a water passing member as viewed from a first accommodating portion side.

As shown in FIG. 3, the left side of the water passing member 20 has a cylindrical shape extending in the horizontal direction, and includes inside a water passing portion 21 through which water flows. As shown in FIGS. 2 and 5C, the lower surface of the water passing member 20 on the left side is formed with three openings communicating with the water passing portion 21. The opening formed on the front and right side is a water side inlet 221 connected to the water supply pipe 31. The opening formed on the back and right side is a hot water side inlet 222 connected to the hot water supply pipe 32. The opening formed on the left side of an intermediate position between the water side inlet 221 and the hot water side inlet 222 is a secondary side outlet 223 connected to the outflow pipe 33. The water supply pipe 31 and the hot water supply pipe 32 are connected to a water supply source and a hot water supply source (not shown), respectively. The outflow pipe 33 is connected to the water supply hose 34 at the lower side of the counter.

As shown in FIG. 4, a gap is provided between an outer peripheral surface 25 of the water passing member 20 on the back side and an inner peripheral surface 123 forming the space on the right side of the main body portion 12. The water supply hose 34 is inserted along the gap while being curved to the back side. The outer peripheral surface 25 of the water passing member 20 on the back side and the inner peripheral surface 123 of the main body portion 12 serve as guiding surfaces when the water supply hose 34 is slidingly moved.

The right side of the water passing member 20 has a cylindrical shape extending in the horizontal direction, and the first accommodating portion 23 is formed therein. As shown in FIG. 5A, a bottom surface 230 of the first accommodating portion 23 is formed with a water supply port 231 communicating with the water side inlet 221, a hot water supply port 232 communicating with the hot water side inlet 222, and a mixed water outflow port 233 communicating with the secondary side outlet 223.

The hot water/water mixing valve 40 accommodated in the first accommodating portion 23 is connected to the water supply port 231, the hot water supply port 232, and the mixed water outflow port 233. The hot water/water mixing valve 40 adjusts the mixing ratio of the water supplied from the water supply pipe 31 and the hot water supplied from the hot water supply pipe 32 and adjusts the outflow amount of the mixed water flowing out to the outflow pipe 33. As shown in FIG. 3, a female screw portion 122 is formed on the inner peripheral surface of the opening 121 of the main body portion 12 on the right side. A fixing member 82 is fastened to the female screw portion 122, and an end surface 821 of the fixing member 82 is in abutment against the hot water/water mixing valve 40. The fixing member 82 is fastened to the female screw portion 122, and thereby hot water/water mixing valve 40 is pressed against and fixed to the bottom surface 230 of the first accommodating portion 23 in a water tight manner.

As shown in FIG. 3, the hot water/water mixing valve 40 includes an operation shaft 41 projecting out from the opening 121 of the main body portion 12. The operation shaft 41 is connected to the mixing valve operating portion 42 for operating the hot water/water mixing valve 40. As shown in FIG. 1, the outer appearance of the mixing valve operating portion 42 is a cylindrical shape extending in the horizontal direction. The mixing valve operating portion 42 has an outer peripheral surface 421 continuing to the outer peripheral surface 129 of the main body portion 12 and forming the same surface therewith, and includes an operation lever 422 extending in the radial direction. The hot water/water mixing valve 40 has a larger mixing ratio of the hot water than the water when the operation lever 422 is located being directed upward, and the mixing ratio of the water increases as the operation lever 422 is moved in the forward direction R1. The hot water/water mixing valve 40 is closed when the operation lever 422 is located being directed in the same direction as the radial direction of the main body portion 12. The hot water/water mixing valve 40 is opened when the operation lever 422 is moved in the direction Z in which the operation lever 422 is tilted to the right side, and the outflow amount from the water discharge port 75 increases as the movement amount of the operation lever 422 increases.

Figure 5B:
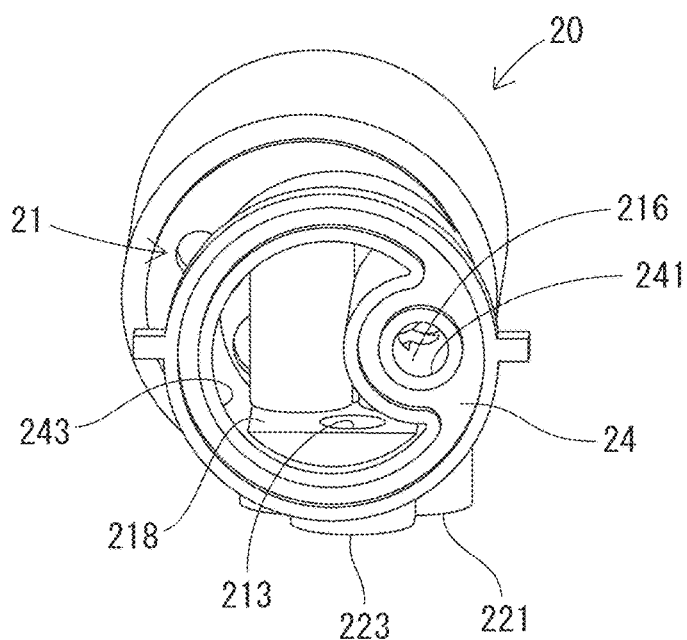
FIG. 5B is a side perspective view of the water passing member as viewed from a second accommodating portion side.
Figure 5C:
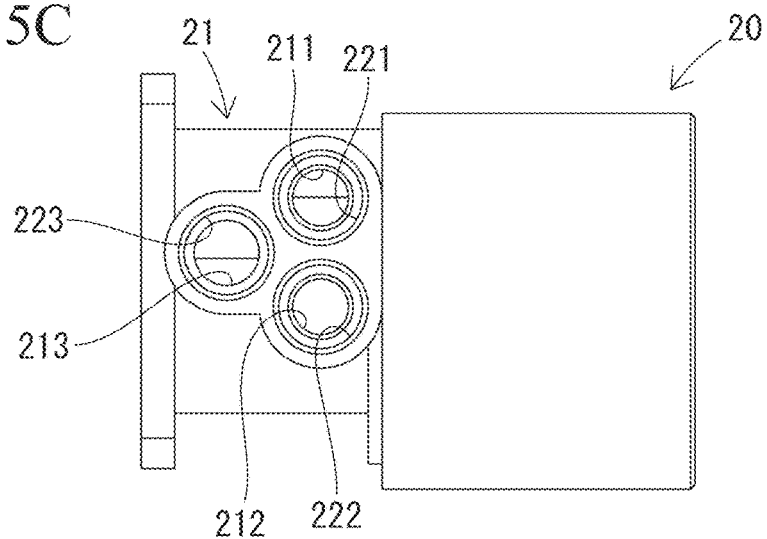
FIG. 5C is a bottom view of the water passing member.

As shown in FIG. 5B, two openings communicating with the water passing portion 21 are formed at a left side end 24 of the water passing member 20. The opening formed on the front side is a raw water supply port 241 communicating with the water side inlet 221. A larger opening formed so as to avoid the raw water supply port 241 is a purified water outflow port 243 communicating with the secondary side outlet 223.

As shown in FIGS. 5A, 5B, 5C and 6, the water passing portion 21 has a flow path extending in the vertical direction and a flow path extending in the horizontal direction between the first accommodating portion 23 and the second accommodating portion 127. A primary side flow path 211 communicating with the water side inlet 221 is extended upward and branched at its upper end. A branched portion 214 is a portion that is branched to a water supply path 215 extending toward the hot water/water mixing valve 40 side and communicating with the water supply port 231, and to a raw water supply path 216 extending toward the water purification cartridge 60 side, which will be described later, and communicating with the raw water supply port 241. A hot water side flow path 212 communicating with the hot water side inlet 222 is extended upward, and bent toward the hot water/water mixing valve 40 side at its upper end to communicate with the hot water supply port 232. A mixed water outflow path 217 communicating with the mixed water outflow port 233 extends in the horizontal direction and joined with a purified water outflow path 218 communicating with the purified water outflow port 243. A secondary side flow path 213 extending downward and communicating with the secondary side outlet 223 is formed below a joined portion 219.

As shown in FIG. 3, the water passing member 20 is connected to the right side surface of the wall portion 124 of the main body portion 12. As shown in FIG. 7, the wall portion 124 has two openings formed at the central side, the openings being communicated with the raw water supply path 216 and the purified water outflow path 218, respectively.

On the left side surface of the wall portion 124, an open/close valve 50 is arranged. The open/close valve 50 opens and closes a flow path between the raw water supply path 216, which is the water passing portion 21, and the second accommodating portion 127 that accommodates a part of the water purification cartridge 60 which will be described later. The open/close valve 50 includes a movable valve 51 having a circular plate shape and a fixing ring 52 having a ring shape.

As shown in FIG. 7, the movable valve 51 is formed with a raw water opening 511 provided at its outer peripheral side and a purified water opening 512 provided at its central side, both of which penetrate therethrough. The raw water opening 511 communicates with the raw water supply path 216 and the purified water opening 512 communicates with the purified water outflow path 218. The movable valve 51 includes a pair of cutout portions 513 formed by cutting out a part of the peripheral edge.

The outer peripheral surface of the fixing ring 52 has a shape along the inner peripheral surface of the second accommodating portion 127. A pair of fixing portions 521 that extend radially inward are formed at the upper part and the lower part of the inner peripheral surface of the fixing ring 52. Each of the fixing portion 521 has the same thickness as the fixing ring 52 and has a through-hole 522 formed at its center. In the inner peripheral surface of the fixing ring 52, a first step portion 523 and a second step portion 526 both of which extend radially inward are formed in a portion where the fixing portions 521 are not provided, in order to prevent the movable valve 51 and the water purification cartridge 60 from coming off from the second accommodating portion 127. The first step portion 523 includes a first step surface 524. With respect to the right side end surface of the fixing ring 52, which is on the side of the wall portion 124 of the main body portion 12, the first step surface 524 is raised from a position close to the left side, which is the water purification cartridge 60 side, by a length corresponding to the thickness of the movable valve 51. The first step surface 524 faces the left side surface of the movable valve 51 which is on the water purification cartridge 60 side. Both ends 525 of the first step portion 523 in the circumferential direction are connected to the peripheral surface of the fixing portion 521. The second step portion 526 includes a second step surface 527. With respect to the first step surface 524, the second step surface 527 is raised from a position close to the left side, which is the water purification cartridge 60 side, by a length corresponding to the thickness of a radial projection 654 of the water purification cartridge 60 which will be described later. The second step surface 527 faces the left side surface of the radial projection 654. The second step portion 526 is formed with a cutout portion 528 that is cut out in the circumferential direction by a length corresponding to the circumferential length of the radial projection 654. The first step portion 523 includes a fixing ring side protrusion 529 provided at a position that is away from the fixing portion 521 in the circumferential direction and in the vicinity of the cutout portion 528 of the second step portion 526. The fixing ring side protrusion 529 extends radially inward so as to cover a part of the second step surface 527.

In a state where the movable valve 51 is sandwiched between the wall portion 124 of the main body portion 12 and the first step surface 524 of the fixing ring 52, countersunk screws 83 are inserted through the through-holes 522 of the fixing ring 52 and fastened to the female screw portions 125 formed in the wall portion 124 of the main body portion 12, whereby the movable valve 51 is disposed on the bottom portion 128 of the second accommodating portion 127. As shown in FIG. 3, an in-plane direction of the movable valve 51 is directed in the vertical direction, and the movable valve 51 is in contact with the wall portion 124 of the main body portion 12 so as to be slidably movable in the circumferential direction. The wall portion 124 of the main body portion 12 functions as a fixing valve 53 fixed to the faucet main body 10, and constitutes the open/close valve 50 for opening and closing the flow path between the raw water supply path 216 and the second accommodating portion 127, together with the movable valve 51.

Next, the water purification cartridge 60 will be described.

Figure 8:
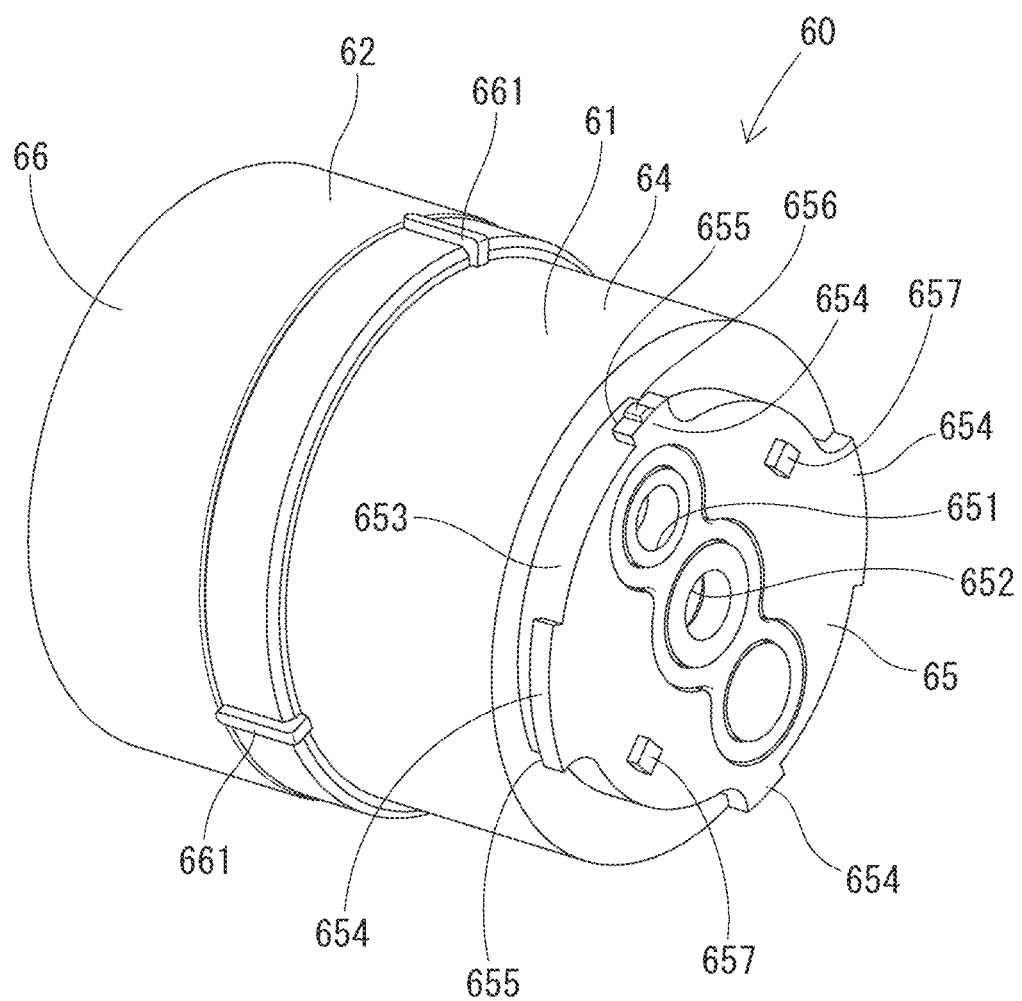
FIG. 8 is a perspective view showing an outer appearance of a water purification cartridge.
Figure 9:
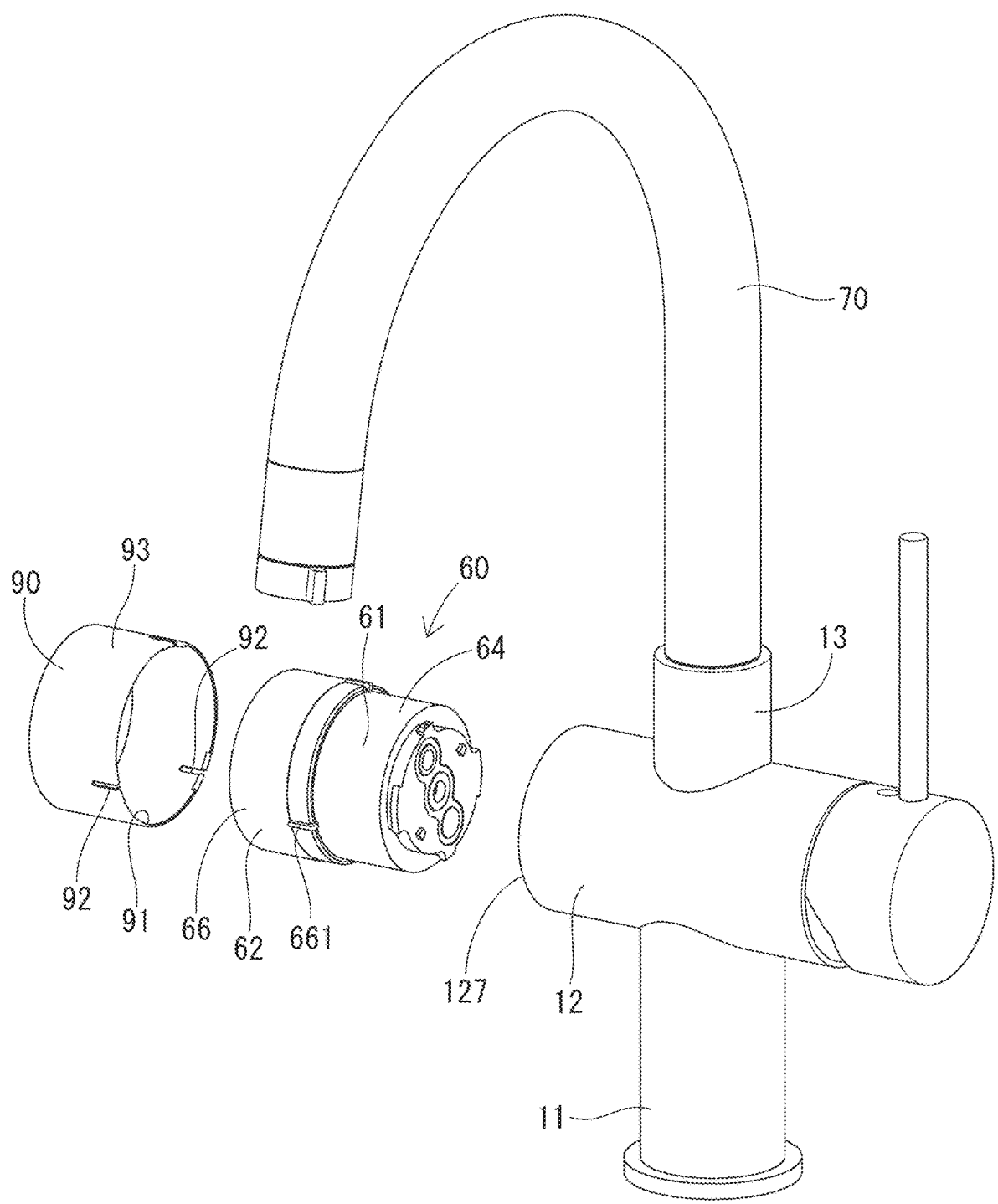
FIG. 9 is an exploded view in which the water purification cartridge is detached from the faucet main body.

The water purification cartridge 60 has an outer appearance of a circular column shape, as shown in FIG. 8, and includes a container main body 61, a lid member 62, and a reforming portion 63. As shown in FIG. 3, the container main body 61 incorporates the reforming portion 63 therein, and is sealed with the lid member 62 fastened thereto. The water purification cartridge 60 gradually deteriorates in its reforming performance as it reforms a predetermined amount of raw water to purified water by the reforming portion 63. The water purification cartridge 60 is a replaceable component that is detached from the second accommodating portion 127 to be replaced when a predetermined usage period has elapsed or the lifetime has expired, as shown in FIG. 9.

The right side portion of the water purification cartridge 60 in the central axis direction is an accommodated portion 64 that is accommodated in the second accommodating portion 127, as shown in FIG. 3. As shown in FIGS. 7 and 8 the accommodated portion 64 has an end surface 65 formed with two openings penetrating in the central axis direction. The opening formed on the outer peripheral side of the end surface 65 is an inflow port 651 that communicates with the raw water supply path 216 of the main body portion 12 and the raw water opening 511 of the movable valve 51 and to which raw water flows in. The opening formed on the central side is an outflow port 652 that communicates with the purified water outflow path 218 of the main body portion 12 and the purified water opening 512 of the movable valve 51 and from which the purified water flows out.

The end surface 65 of the accommodated portion 64 includes a smaller diameter portion 653 which is smaller than the outer diameter of the accommodated portion 64. The smaller diameter portion 653 has a size that can be inserted into the inner peripheral side of the fixing ring 52, and includes the radial projections 654 projecting out in the radial direction from the outer peripheral surface. With respect to the end surface of the accommodated portion 64 on the outer peripheral side, the radial projections 654 are formed with a distance of the same length as the thickness of the second step portion 526 of the fixing ring 52. The outer shape of the radial projection 654 has a shape that can be inserted into the cutout portion 528 of the fixing ring 52, and has an opposing surface 655 that can face the second step surface 527 of the fixing ring 52. A plurality of the radial projections 654 is provided at intervals in the circumferential direction. The outer periphery of at least one of the radial projections 654 is formed with a cartridge side protrusion 656 projecting out in the radial direction.

The end surface 65 of the accommodated portion 64 is formed with axial projections 657 projecting out in the central axis direction. The outer shape of each axial projection 657 is a rectangular shape. In a state where the accommodated portion 64 is accommodated in the second accommodating portion 127, the axial projections 657 are inserted in rectangular through-holes 514 formed in the movable valve 51, so that the outer peripheral surface of the axial projection 657 and the inner peripheral surface of the through-hole 514 of the movable valve 51 are engaged with each other; thus the water purification cartridge 60 and the open/close valve 50 are coupled.

The left side portion of the water purification cartridge 60 in the central axis direction is exposed from the second accommodating portion 127 of the faucet main body 10 as shown in FIGS. 1 and 3, and serves as the water purification operating portion 66 for operating to open and close the open/close valve 50. As shown in FIGS. 8 and 9, the water purification operating portion 66 includes ribs 661 projecting out in the radial direction from the outer periphery, and is covered with a cover member 90. An opening end 91 of the cover member 90 is formed with groove portions 92 through which the ribs 661 are inserted. The cover member 90 is attached to the container main body 61 so as to be detachable in the central axis direction. In a state where the accommodated portion 64 is accommodated in the second accommodating portion 127, an outer peripheral surface 93 of the cover member 90 forms the same surface continuing with the outer peripheral surface 129 of the main body portion 12.

As shown in FIG. 3, the reforming portion 63 includes a porous ceramic core material 632 in which a through channel 631 extending in the central axis direction is formed, and an activated carbon 633 formed in a cylindrical shape and provided around the outer periphery of the core material 632. The reforming portion 63 is disposed inside the container main body 61 over substantially its entire length in the central axis direction, and is disposed across the inside of the accommodated portion 64 and the inside of the water purification operating portion 66. A gap 67 is provided between an outer peripheral surface 634 of the reforming portion 63 and an inner peripheral surface 611 of the container main body 61, and the inflow port 651 is communicated with the gap 67. The through channel 631 of the reforming portion 63 is communicated with the outflow port 652. Accordingly, the raw water flowing in from the inflow port 651 flows through the gap 67 and infiltrates into the inside of the reforming portion 63 from the outer peripheral surface 634. At this time, chlorine and turbidity in the raw water are removed by the reforming portion 63 so that the raw water is reformed to purified water and flows out from the outflow port 652 through the through channel 631.

Next, the operation mechanism of the water purification operating portion 66 and the open/close valve 50 will be described.

As shown in FIGS. 3 and 7, the accommodated portion 64 of the water purification cartridge 60 is accommodated so as to be rotatable about the central axis of the accommodated portion 64 with respect to the second accommodating portion 127 of the main body portion 12. When the accommodated portion 64 is accommodated in the second accommodating portion 127, the outer peripheral surface of the axial projection 657 of the water purification cartridge 60 and the inner peripheral surface of the through-hole 514 of the movable valve 51 are always engaged, and the inflow port 651 and the outflow port 652 of the water purification cartridge 60 are communicated with the raw water opening 511 and the purified water opening 512 of the movable valve 51, respectively.

When the user rotates the water purification operating portion 66, the entire water purification cartridge 60 is rotated with respect to the faucet main body 10, and the outer peripheral surface of each axial projection 657 is locked to the inner peripheral surface of each through-hole, so that the movable valve 51 is rotated together. Therefore, the inflow port 651 and the outflow port 652 of the water purification cartridge 60 maintain the communicated state with the raw water opening 511 and the purified water opening 512 of the movable valve 51, respectively.

The outflow port 652 of the water purification cartridge 60, the purified water opening 512 of the movable valve 51, and the purified water outflow path 218 of the main body portion 12 are lined on the central axis of the accommodated portion 64. Therefore, the outflow port 652, the purified water opening 512, and the purified water outflow path 218 are always in communication with each other, and even when the user rotates the water purification operating portion 66, the communicated state is maintained.

Figure 10:
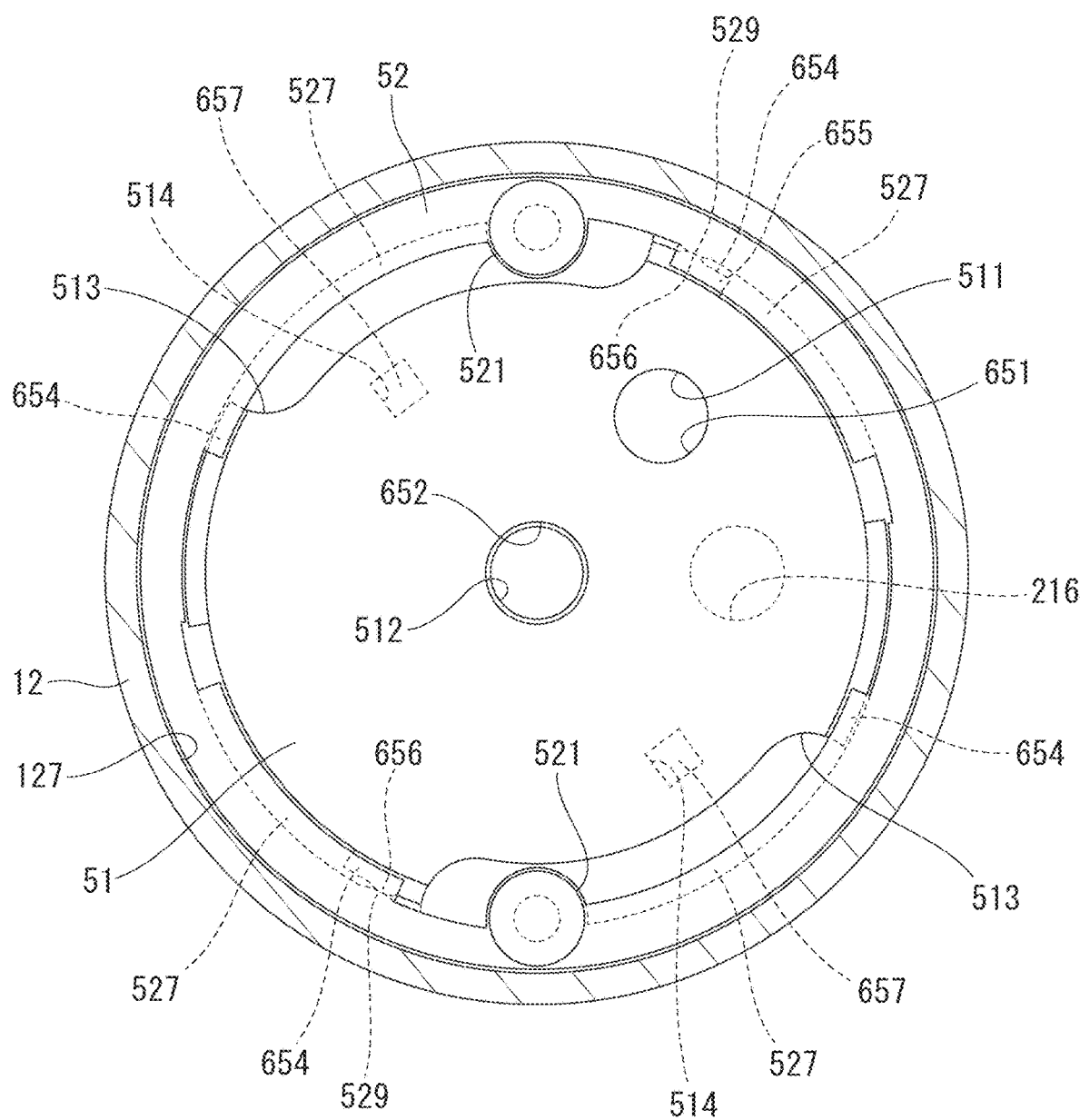
FIG. 10 is a cross-sectional view of a periphery of an open/close valve with the second accommodating portion cut along line A-A shown in FIG. 3 and a part of the water purification cartridge omitted, showing a state in which the open/close valve is closed.

In a state where the open/close valve 50 is closed, as shown in FIG. 10, the raw water opening 511 of the movable valve 51 is located at a position shifted in the circumferential direction from the position of the raw water supply path 216 of the main body portion 12. Therefore, the raw water supply path 216 is shut off by the side surface of the movable valve 51 on the fixing valve 53 side and is not communicated with the raw water opening 511, so that the raw water does not flow toward the water purification cartridge 60 side.

The radial projections 654 of the water purification cartridge 60 are sandwiched between the second step surface 527 of the fixing ring 52 and the movable valve 51. Therefore, even if the user pulls the water purification cartridge 60 in the rotation axis direction, the opposing surface 655 of the radial projection 654 is locked to the second step surface 527, so that the water purification cartridge 60 cannot be detached from the faucet main body 10.

Figure 11:
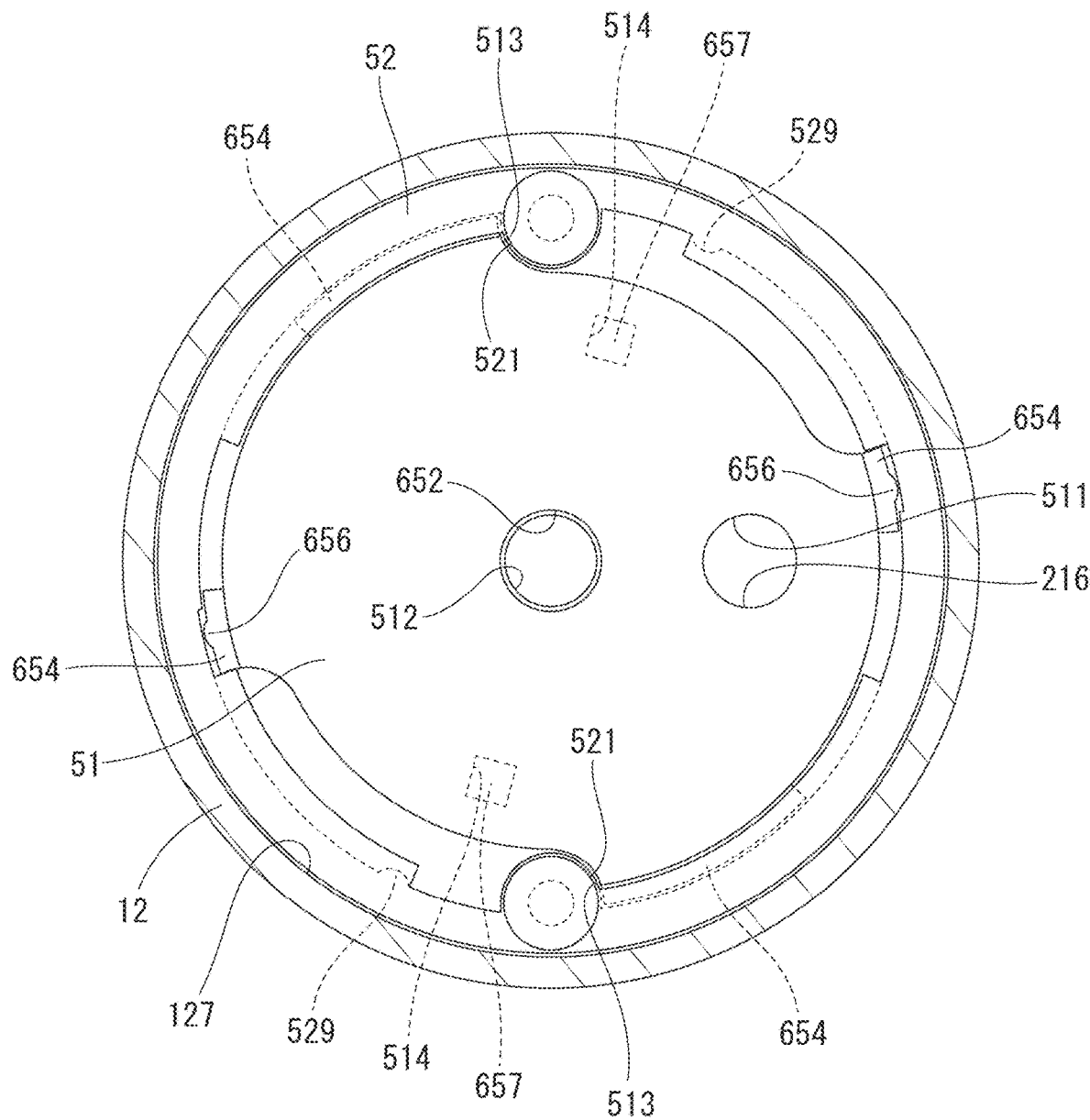
FIG. 11 is a cross-sectional view of a periphery of the open/close valve with the second accommodating portion cut along line A-A shown in FIG. 3 and a part of the water purification cartridge omitted, showing a state in which the open/close valve is opened.

When the user rotates the water purification operating portion 66 in the forward direction R2 as shown in FIG. 1, the movable valve 51 rotates together with the water purification cartridge 60, and as shown in FIG. 11, the raw water opening 511 of the movable valve 51 communicates with the raw water supply path 216 of the main body portion 12. Therefore, the raw water flows from the raw water supply path 216 toward the water purification cartridge 60 side through the raw water opening 511 of the movable valve 51.

When the user further rotates the water purification operating portion 66 in the forward direction R2, the cutout portion 513 of the movable valve 51 is locked to the outer peripheral surface of the fixing portion 521 of the fixing ring 52. Thereby, the rotation of the water purification operating portion 66 in the forward direction R2 is restricted.

In a state where the open/close valve 50 is opened, when the user rotates the water purification operating portion 66 in the backward direction R3 as shown in FIG. 1, the raw water supply path 216 is shut off by the side surface of the movable valve 51 on the fixing valve 53 side so that the open/close valve 50 becomes a closed state as shown in FIG. 10. When the user further rotates the water purification operating portion 66 in the backward direction R3, the cartridge side protrusion 656 is locked to the fixing ring side protrusion 529. Thereby, the rotation of the water purification operating portion 66 in the backward direction R3 is temporarily restricted.

Figure 12:
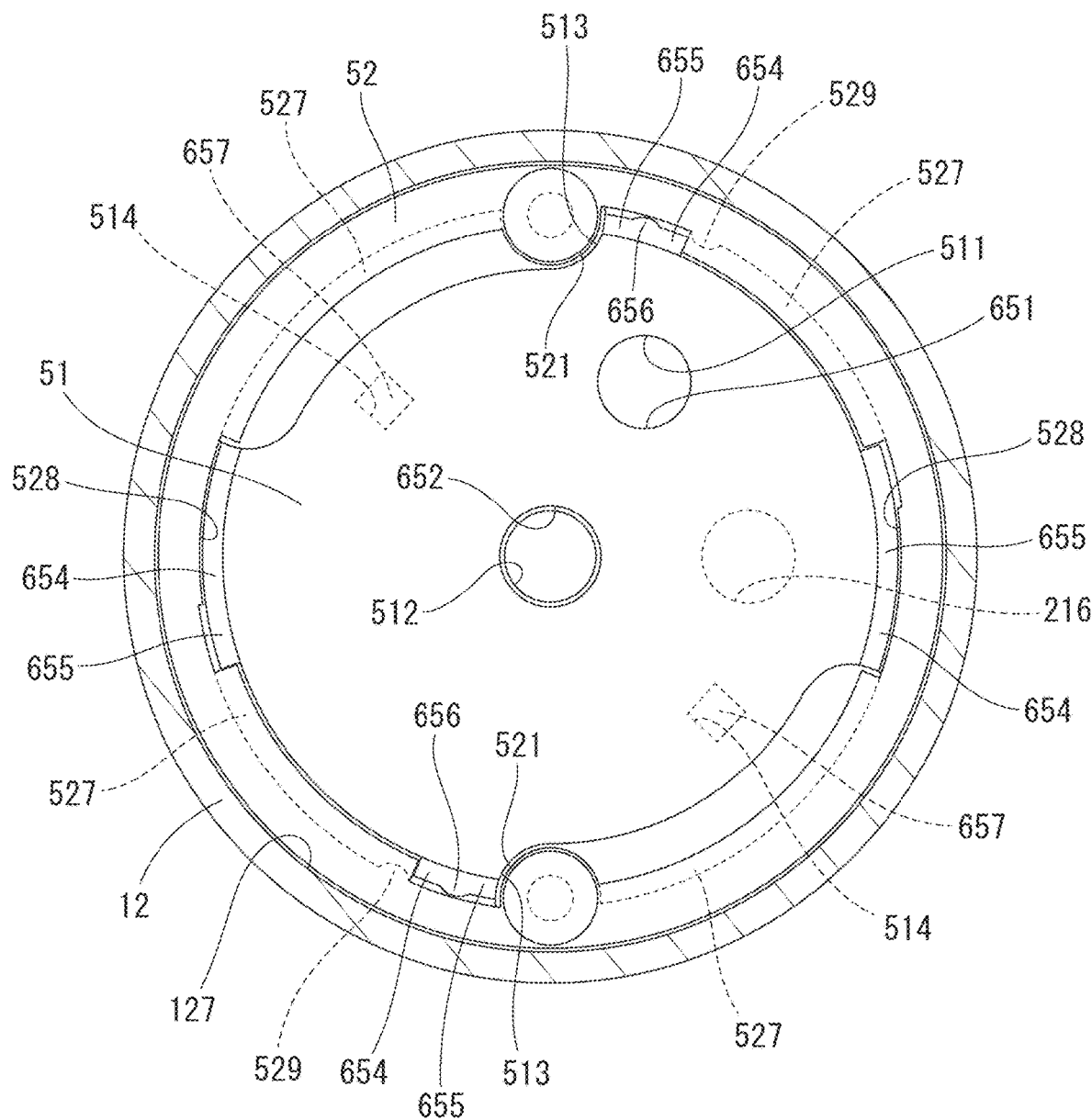
FIG. 12 is a cross-sectional view of a periphery of the open/close valve with the second accommodating portion cut along line A-A shown in FIG. 3 and a part of the water purification cartridge omitted, showing a state in which the water purification cartridge can be removed.

When the user still further rotates the water purification operating portion 66 in the backward direction R3, the cartridge side protrusion 656 is elastically deformed and rides over the fixing ring side protrusion 529, whereby the rotation restriction in the backward direction R3 is released. When the user still further rotates the water purification operating portion 66 in the backward direction R3, as shown in FIG. 12, the cutout portion 513 of the movable valve 51 is locked to the outer peripheral surface of the fixing portion 521 of the fixing ring 52, so that the rotation in the backward direction R3 is restricted. In some embodiments, the radial projection 654 of the water purification cartridge 60 coincides with the position of the cutout portion 528 of the fixing ring 52 when viewed in the rotation axis direction, and the opposing surface 655 of the radial projection 654 does not face the second step surface 527 of the fixing ring 52. Therefore, when the user pulls the water purification cartridge 60 in the rotation axis direction, the opposing surface 655 of the radial projection 654 is not locked to the second step surface 527, so that the water purification cartridge 60 can be detached from the faucet main body 10.

In such a state where the water purification cartridge 60 can be detached from the faucet main body 10, the open/close valve 50 is maintained in the closed state since the raw water supply path 216 is continuously shut off by the side surface of the movable valve 51 on the fixing valve 53 side.

The faucet device 1 according to some embodiments includes the hot water/water mixing valve 40, the water purification cartridge 60, the primary side flow path 211 that supplies water to the hot water/water mixing valve 40 and the water purification cartridge 60, and the secondary side flow path 213 that discharges mixed water flowing out from the hot water/water mixing valve 40 and purified water flowing out from the water purification cartridge 60 to the water discharge port 75. The primary side flow path 211 and the secondary side flow path 213 are disposed between the hot water/water mixing valve 40 and the water purification cartridge 60.

According to such a faucet device 1, since the primary side flow path 211 and the secondary side flow path 213 are disposed between the hot water/water mixing valve 40 and the water purification cartridge 60, the primary side flow path 211 and the secondary side flow path 213 can be shortened. Therefore, the faucet device 1 can be made smaller.

In the faucet device 1 according to some embodiments, the hot water/water mixing valve 40 and the water purification cartridge 60 are disposed side by side in a horizontal direction when attached to the counter.

In some embodiments, since the hot water/water mixing valve 40 and the water purification cartridge 60 are disposed close to each other, the primary side flow path 211 and the secondary side flow path 213 can be shortened. Thus, the faucet device 1 can be made smaller.

The faucet device 1 according to some embodiments includes the first accommodating portion 23 that accommodates the hot water/water mixing valve 40 and the second accommodating portion 127 that accommodates the water purification cartridge 60. The first accommodating portion 23 and the second accommodating portion 127 is formed by opening both end surfaces of the main body portion 12 having a circular column shape extending in the horizontal direction.

In some embodiments, the shape of the main body portion 12 constituting the first accommodating portion 23 and the second accommodating portion 127 can be simplified. Thus, the faucet device 1 can be made smaller. Here, the first accommodating portion 23 is formed via the water passing member 20, by the opening 22 of the water passing member 20 that communicates with the right side opening 121 of the main body portion 12. The second accommodating portion 127 is directly formed in the main body portion 12 by the left side opening 126 of the main body portion 12.

The faucet device 1 according to some embodiments includes the base portion 11 attached to the counter and the discharge pipe 70 which is a discharging portion that extends from the base portion 11 via the main body portion 12 and the holding portion 13 and has the water discharge port 75 on the distal end side. The base portion 11 interiorly includes the primary side flow path 211, the secondary side flow path 213, the hot water side flow path 212 that supplies hot water to the hot water/water mixing valve 40, and the water supply hose 34 connecting the secondary side flow path 213 and the water discharge port 75. The discharge pipe 70 interiorly includes the water supply hose 34 such that the water supply hose 34 is slidably movable, and holds the water discharge port 75 such that the water discharge port 75 can be freely pulled out together with the water supply hose 34.

In some embodiments, the secondary side flow path 213 through which the mixed water flowing out from the hot water/water mixing valve 40 flows and the secondary side flow path 213 through which the purified water flowing out from the water purification cartridge 60 flows are joined into the water supply hose 34 and connected to the water discharge port 75. Thus, the flow paths can be collected, so that the faucet device 1 can be made smaller. Furthermore, since the water discharge port 75 can be freely pulled out, usability of the faucet device 1 can be improved.

In the faucet device 1 according to some embodiments, the branched portion 214 is arranged between the hot water/water mixing valve 40 and the water purification cartridge 60. The primary side flow path 211 is branched at the branched portion 214 to be connected to the water supply path 215 toward the hot water/water mixing valve 40 and to the raw water supply path 216 toward the water purification cartridge 60.

In some embodiments, the water supply path 215 to the hot water/water mixing valve 40 and the raw water supply path 216 to the water purification cartridge 60 can be collected in one path up to the branched portion 214. Thus, the faucet device 1 can be made smaller.

In the faucet device 1 according to some embodiments, the open/close valve 50 that opens and closes the raw water supply path 216 is disposed between the hot water/water mixing valve 40 and the water purification cartridge 60.

In some embodiments, since the open/close valve 50 is disposed near the water purification cartridge 60, the raw water supply path 216 can be shortened. Thus, the faucet device 1 can be made smaller.

In the faucet device 1 according to some embodiments, the open/close valve 50 includes the fixing valve 53 and the plate-like movable valve 51 that is in contact with the fixing valve 53 so as to be slidably movable.

In some embodiments, since the open/close valve 50 can be made thinner than that formed by a cylinder valve having a cylindrical shape or the like, the faucet device 1 can be made smaller.

In the faucet device 1 according to some embodiments, the in-plane direction of the movable valve 51 is vertical when the movable valve 51 is attached to the counter.

In some embodiments, since the space between the hot water/water mixing valve 40 and the water purification cartridge 60 can be reduced, the faucet device 1 can be made smaller.

In the faucet device 1 according to some embodiments, the joined portion 219 is arranged between the hot water/water mixing valve 40 and the water purification cartridge 60. The mixed water outflow path 217 from the hot water/water mixing valve 40 and the purified water outflow path 218 from the water purification cartridge 60 are joined at the joined portion 219 to be connected to the secondary side flow path 213.

In some embodiments, the mixed water outflow path 217 from the hot water/water mixing valve 40 and the purified water outflow path 218 from the water purification cartridge 60 can be collected into one path from the joined portion 219. Thus, the faucet device 1 can be made smaller.

The faucet device 1 according to some embodiments further includes the faucet main body 10. The faucet main body 10 includes the raw water supply path 216 through which the raw water flows, the second accommodating portion 127 communicating with the raw water supply path 216, and the open/close valve 50 that opens and closes the flow path between the raw water supply path 216 and the second accommodating portion 127. The water purification cartridge 60 further includes the accommodated portion 64 that is accommodated in the second accommodating portion 127 so as to be detachable therefrom, and the water purification operating portion 66 that is exposed from the second accommodating portion 127 and operated to open and close the open/close valve 50. The water purification cartridge 60 incorporates the reforming portion 63 that reforms the raw water flowing into the second accommodating portion 127 into purified water.

According to such a faucet device 1, since the water purification cartridge 60 includes the water purification operating portion 66 that is operated to open and close the open/close valve 50, the open/close valve 50 can be operated by simply arranging the second accommodating portion 127 in the faucet main body 10, so that it is not necessary to arrange both of the second accommodating portion 127 and the water purification operating portion 66 in the faucet main body 10. Therefore, the faucet main body 10 can be made smaller and the faucet device 1 can be made smaller.

In the faucet device 1 according to some embodiments, the accommodated portion 64 has a circular column outer shape and is accommodated in the second accommodating portion 127 so as to be rotatable about the central axis of the accommodated portion 64.

In some embodiments, since the accommodated portion 64 having a circular column shape rotates about its central axis, the second accommodating portion 127 can be made smaller by being formed in a circular column shape having the same central axis as the accommodated portion 64.

In the faucet device 1 according to some embodiments, the water purification cartridge 60 includes the inflow port 651 which is provided on the outer peripheral side and to which the raw water flows in from the raw water supply path 216, and the outflow port 652 which is provided on the central axis side and from which the purified water flows out from the reforming portion 63.

In some embodiments, since the outflow port 652 is provided on the central axis side of the water purification cartridge 60, the outflow port 652 does not move in the circumferential direction even when the water purification cartridge 60 rotates about the central axis. Therefore, by arranging the purified water opening 512 of the movable valve 51 and the purified water outflow path 218 of the main body portion 12 coaxially side by side, the flow path through which the purified water flows can easily be communicated, so that the flow path can be shortened. As a result, the faucet main body 10 can be made smaller.

In the faucet device 1 according to some embodiments, the water purification cartridge 60 has the inflow port 651 and the outflow port 652 on the end surface of the accommodated portion 64.

In some embodiments, since the inflow port 651 and the outflow port 652 are provided collectively at the end surface of the accommodated portion 64, the radial dimension of the water purification cartridge 60 can be reduced, and the water passing portion 21 can be shortened. Thus, the faucet device 1 can be made smaller.

In the faucet device 1 according to some embodiments, the central axis of the accommodated portion 64 serves as the rotation axis of the water purification operating portion 66. On the basis of the position where the open/close valve 50 is closed, when the water purification operating portion 66 is rotated in the forward direction, the open/close valve 50 is opened, and when the water purification operating portion 66 is rotated in the backward direction, the water purification cartridge 60 becomes ready to be detached from the second accommodating portion 127.

In some embodiments, when detaching the water purification cartridge 60 from the second accommodating portion 127, the open/close valve 50 is maintained in a closed state. This prevents the raw water from being discharged from the second accommodating portion 127. Furthermore, when the water purification cartridge 60 is detached from the second accommodating portion 127, the operating portion of the open/close valve 50 is also detached from the faucet main body 10. This prevents the open/close valve 50 from being mistakenly operated during the replacement of the water purification cartridge 60.

In the faucet device 1, the open/close valve 50 is disposed at the bottom portion 128 of the second accommodating portion 127.

In some embodiments, since the open/close valve 50 and the second accommodating portion 127 are disposed close to each other, the raw water supply path 216 and the purified water outflow path 218 can be shortened. Thus, the faucet main body 10 can be made smaller.

In the faucet device 1 according to some embodiments, the open/close valve 50 includes the fixing valve 53 which is the wall portion 124 of the faucet main body 10 and the plate-like movable valve 51 that is in contact with the fixing valve 53 so as to be slidably movable.

In some embodiments, since the open/close valve 50 can be made thinner than that formed by a cylinder valve having a cylindrical shape or the like, the faucet main body 10 can be made smaller.

In the faucet device 1 according to some embodiments, the open/close valve 50 includes the through-hole in the movable valve 51 as a locking portion, and the water purification cartridge 60 includes the axial projection 657 that is locked to the inner peripheral surface of the through-hole.

In some embodiments, by simply accommodating the water purification cartridge 60 into the second accommodating portion 127, the axial projection 657 is inserted in and engaged with the through-hole so that the open/close valve 50 and the water purification cartridge 60 are coupled. Therefore, the coupling structure is simplified and the faucet device 1 can be made smaller.

In the faucet device 1 according to some embodiments, the reforming portion 63 is disposed across the inside of the accommodated portion 64 and the inside of the water purification operating portion 66.

In some embodiments, since the reforming portion 63 is arranged not only inside the second accommodating portion 127 but also inside the water purification operating portion 66 exposed from the second accommodating portion 127 of the faucet main body 10, the volume of the reforming portion 63 can be made larger than that of the second accommodating portion 127. As a result, the performance of the water purification cartridge 60 can be improved; for example, life of the water purification cartridge 60 is extended. Furthermore, by arranging the reforming portion 63 also inside the water purification operating portion 66, the accommodated portion 64 can be made smaller, and thus, the faucet main body 10 can be made smaller The faucet device 1 according to some embodiments includes the cover member 90 that covers the water purification operating portion 66.

In some embodiments, the design of the water purification operating portion 66 can be improved.

The present disclosure is not limited to the embodiments described with reference to the above description and drawings, and the following embodiments are also encompassed in the technical scope of the present disclosure.

The faucet device 1 may not be attached to a horizontal counter, and may be attached to a counter inclined with respect to a horizontal direction or a vertically raised wall surface.

The primary side flow path 211 and the secondary side flow path 213 are both disposed between the hot water/water mixing valve 40 and the water purification cartridge 60, but only one of them may be disposed therebetween; the faucet device 1 can be still made smaller.

The hot water/water mixing valve 40 and the water purification cartridge 60 may not be disposed side by side in the horizontal direction in a state where the faucet device 1 is attached to the to-be-attached portion, and may be arranged shifted in the height direction or in the circumferential direction of the faucet main body 10.

The main body portion 12 has a circular column shape extending in the horizontal direction, but its shape is not particularly limited and may be a rectangular shape.

The hot water/water mixing valve 40 and the water purification cartridge 60 are both accommodated in the main body portion 12, but the hot water/water mixing valve 40 and the water purification cartridge 60 merely need to be connected to the primary side flow path 211 and the secondary side flow path 213, and may be arranged such that the hot water/water mixing valve 40 and the water purification cartridge 60 are exposed from the faucet device 1.

The branched portion 214 and the joined portion 219 are both arranged between the hot water/water mixing valve 40 and the water purification cartridge 60, but only one of them may be arranged there between, or both may be arranged at another position.

The discharge pipe 7 is connected so as to extend upward from the base portion 11, but may not extend in the vertical direction from the base portion 11. The discharge pipe 70 may extend in the diagonal direction with respect to the faucet main body 10 or may extend from a position shifted in the radial direction with respect to the central axis of the base portion 11. Furthermore, the discharge pipe 70 may be fixed so as not to be rotatable with respect to the main body portion 12. The holding structure between the discharge pipe 70 and the holding portion 13 is not limited to the structure that the screw member 81 is screwed for locking.

The secondary side flow path 213 may not be connected to the water supply hose 34, and the secondary side flow path 213 may be connected to the water discharge port 75 without extending toward the lower side of the counter, and the water discharge port 75 may be fixed to the discharging portion.

The open/close valve 50 is not limited to the one including the plate-like movable valve 51, and may be a cylinder valve, a flow rate adjustment valve that can adjust the discharge flow rate of purified water, or a switching valve that switches the route of the water passing portion.

The reforming portion 63 of the water purification cartridge 60 is not limited to activated carbon or a ceramic filter, and may adopt a hollow fiber or an ion exchange resin. The reforming portion 63 may reform raw water into soft water.

The water purification cartridge 60 includes the water purification operating portion 66 at the portion exposed from the faucet main body 10, but the water purification operating portion 66 may be provided in the faucet main body 10.

The reforming portion 63 is disposed across the inside of the accommodated portion 64 and the inside of the water purification operating portion 66, but it may be disposed only inside the accommodated portion 64, or only inside the water purification operating portion 66.

The water purification cartridge 60 may not be accommodated so as to be detachable in the horizontal direction in a state where the faucet device 1 is attached to the to-be-attached portion, and may be accommodated so as to be detachable in the vertical direction with respect to the faucet main body 10.

The inflow port 651 of the water purification cartridge 60 may not be provided on the end surface 65 of the accommodated portion 64, and an inflow portion may be formed on the outer peripheral surface of the water purification cartridge 60.

The water purification cartridge may be formed with an opening on the outer peripheral surface of the container main body 61, and a part of the reforming portion 63 may be exposed to the outer appearance. In some embodiments, the space between the outer periphery of the water purification cartridge and an accommodating portion of the water purification cartridge of the faucet main body may be the water passing portion.

The open/close valve 50 opens and closes the raw water supply path 216, but may open and close the purified water outflow path 218, or may open and close both of the raw water supply path 216 and the purified water outflow path 218.

The coupling structure between the water purification cartridge 60 and the open/close valve 50 is not limited to the structure of the locking portion, and a structure in which the outflow port 652 projects out from the end surface 65 of the water purification cartridge 60 and is locked and coupled with the open/close valve 50 may be adopted.

In the water purification operating portion 66, the rotating direction is restricted by the fixing ring 52, but the rotating direction may not be restricted. For example, the open/close valve 50 may be configured to be opened and closed every time the water purification operating portion 66 is rotated 90 degrees. Furthermore, the water purification operating portion 66 is rotationally operated, but it may be a push button to be operated by pushing.

The entire water purification cartridge 60 is rotated when the water purification operating portion 66 is operated, but the water purification cartridge 60 may be configured to be partially movable.

What is claimed is:

1. A faucet device comprising:
   a hot water/water mixing valve;
   a water purification cartridge;
   a primary side flow path configured such that the primary side flow path supplies water to the hot water/water mixing valve and the water purification cartridge;
   a secondary side flow path configured such that the secondary side flow path discharges mixed water flowing out from the hot water/water mixing valve and purified water flowing out from the water purification cartridge, to a water discharge port; and
   a base portion that interiorly includes the primary side flow path and the secondary side flow path and has a longitudinal axis of symmetry,
   wherein
   the hot water/water mixing valve and the water purification cartridge are disposed adjacent in a direction perpendicular to an extending direction of the base portion with the longitudinal axis of symmetry of the base portion located between the hot water/water mixing valve and the water purification cartridge, and
   at least one of the primary side flow path and the secondary side flow path is disposed between the hot water/water mixing valve and the water purification cartridge.

2. The faucet device of claim 1, further comprising:
   a faucet main body including: a water passing portion through which water flows; an accommodating portion communicating with the water passing portion; and an open/close valve that opens and closes a flow path between the water passing portion and the accommodating portion,
   wherein the water purification cartridge further includes an accommodated portion that is accommodated in the accommodating portion so as to be detachable therefrom, and an operating portion that is exposed from the accommodating portion and operated to open and close the open/close valve, the water purification cartridge incorporating a reforming portion that reforms raw water flowing into the accommodating portion into purified water.

3. The faucet device of claim 2, wherein the accommodated portion has a circular column outer shape and is accommodated in the accommodating portion so as to be rotatable about a central axis of the accommodated portion.

4. The faucet device of claim 3, wherein the water purification cartridge includes an inflow port which is provided on an outer peripheral side and to which raw water flows in from the water passing portion, and an outflow port which is provided on a central axis side and from which purified water flows out from the reforming portion.

5. The faucet device of claim 2, wherein the reforming portion is disposed across an inside of the accommodated portion and an inside of the operating portion.

6. The faucet device of claim 1, further comprising:
   a circular column extending in the direction perpendicular to the extending direction of the base portion, wherein
   a first end of the circular column is a first accommodating portion that accommodates the hot water/water mixing valve; and
   a second end of the circular column is a second accommodating portion that accommodates the water purification cartridge.

7. The faucet device of claim 1, further comprising:
   a discharging portion extending from the base portion and having the water discharge port on a distal end side, wherein
   the base portion interiorly includes a hot water side flow path that supplies hot water to the hot water/water mixing valve, and a water supply hose connecting the secondary side flow path and the water discharge port, and
   the discharging portion interiorly includes the water supply hose such that the water supply hose is slidably movable, and holds the water discharge port such that the water discharge port can be freely pulled out together with the water supply hose.

8. The faucet device of claim 1, wherein a branched portion is arranged between the hot water/water mixing valve and the water purification cartridge, the primary side flow path being branched at the branched portion to be connected to a water supply path toward the hot water/water mixing valve and to a raw water supply path toward the water purification cartridge.

9. The faucet device of claim 1, wherein a joined portion is arranged between the hot water/water mixing valve and the water purification cartridge, a mixed water outflow path from the hot water/water mixing valve and a purified water outflow path from the water purification cartridge are joined at the joined portion to be connected to the secondary side flow path.

* * * * *